United States Patent [19]

Fleck et al.

[11] 4,025,005

[45] May 24, 1977

[54] WEB FEEDING AND COLLECTING APPARATUS FOR PHOTOGRAPHIC PRINTERS OR THE LIKE

[75] Inventors: Adolf Fleck, Unterhaching; Christian Götze, Munich; Erich Nagel, Anzing, all of Germany

[73] Assignee: AGFA-Gevaert, A.G., Leverkusen, Germany

[22] Filed: Aug. 29, 1975

[21] Appl. No.: 609,053

[30] Foreign Application Priority Data

Sept. 21, 1974 Germany .......................... 2445259

[52] U.S. Cl. ................................ 242/75.2; 226/39; 226/176; 242/151

[51] Int. Cl.$^2$ ........................................ B65H 23/10

[58] Field of Search ................. 242/75.2, 151, 152, 242/67.1–67.5; 226/39, 195, 176, 181; 188/65.1

[56] References Cited

UNITED STATES PATENTS

| | | | |
|---|---|---|---|
| 1,263,419 | 4/1918 | James | 242/75.2 |
| 1,910,154 | 5/1933 | Eitzen | 226/39 X |
| 2,099,376 | 11/1937 | Shapiro | 242/75.2 X |
| 2,202,883 | 6/1940 | Yoder | 242/67.1 R |
| 2,362,920 | 11/1944 | Moore | 242/151 X |
| 3,250,488 | 5/1966 | Prager | 242/75.2 X |
| 3,904,145 | 9/1975 | Steinberger | 242/75.2 |

*Primary Examiner*—Stanley N. Gilreath
*Assistant Examiner*—John M. Jillions
*Attorney, Agent, or Firm*—Michael J. Striker

[57] ABSTRACT

A photographic printer wherein a web of photographic paper is being withdrawn by advancing rolls stepwise from a supply reel and is fed toward a copying station where successive increments of the web are exposed to light during intervals of idleness of the advancing rolls. The copying station is followed by a loop former for the web, by two normally spaced-apart rollers which are located at the opposite sides of the path for the web, and by a motor-driven flangeless takeup reel. One of the rollers is coupled to a hysteresis brake and the other roller can be propelled toward the one roller by an electromagnet which is energized when the motor for the take-up reel is arrested whereby the rollers pinch the web with a force which prevents any slippage of the web. The motor is started and stopped when the size of the loop respectively reaches a preselected maximum and a preselected minimum value. If the inertia of the take-up reel is so high that the latter continues to rotate after stoppage of the motor and after the convolutions of the web are tightly packed thereon, the web rotates the rollers against the opposition of the brake which is adjustable to insure that the rollers begin to rotate before the web breaks. The brake brings about a controlled deceleration of the web and takeup reel to zero speed.

15 Claims, 3 Drawing Figures

WEB FEEDING AND COLLECTING APPARATUS FOR PHOTOGRAPHIC PRINTERS OR THE LIKE

CROSS-REFERENCE TO RELATED APPLICATION

The apparatus of the present invention constitutes an improvement over and a further development of apparatus which are disclosed in the commonly owned copending application Ser. No. 364,080 filed May 25, 1973 by Siegfried Steinberger et al, now U.S. Pat. No. 3,904,145.

BACKGROUND OF THE INVENTION

The present invention relates to apparatus for feeding and collecting webs or strips, especially webs or strips of photographic paper in a photographic printer or copier. More particularly, the invention relates to improvements in apparatus of the type disclosed in the aformentioned commonly owned copending application Ser. No. 364,080 by Steinberger et al now U.S. Pat. No. 3,904,145.

The application of Steinberger et al discloses apparatus which transport webs of photographic paper in a printer wherein the web is moved stepwise by advancing or feeding rolls serving to draw the web off a supply reel so that a portion of frame (having a length corresponding to or slightly exceeding that of a print) is held at a standstill at the copying station when the printer is actuated to make an exposure. The exposed portion of the web is convoluted on the core of a takeup reel which is driven by a motor in stepwise fashion. In order to insure that the take-up reel will accumulate tightly packed convolutions of exposed web, the apparatus further comprises a friction brake which is actuated (a) by the web or (b) by an electromagnet and grips the web between the copying station and the takeup reel while the latter continues to rotate due to inertia subsequent to stoppage of the motor. The length of the web can be in the range of several hundred meters, and the takeup reel is preferably devoid of flanges so that its core can collect relatively wide or relatively narrow webs. Thus, it is not necessary to adjust the takeup reel when the persons in charge decide to transport webs whose width deviates from the width of previously transported web or webs.

In the friction brakes of the type disclosed in the application of Steinberger et al, the friction coefficient between the components of the brake varies in dependency on factors which are often beyond the control of operators. Such factors include the speed at which one or more rigid components of the brake move relative to one or more stationary rigid components. The coefficient of friction decreases with increasing relative speed and reaches a maximum value when the relative speed is zero. This means that tensional stresses upon the web can reach a very high value, especially when the takeup reel already contains a large supply of convoluted material, because the kinetic energy of the takeup reel plus the kinetic energy of that portion of the web which is already convoluted thereon is converted into a force tending to stretch and eventually break the web when the latter is held against movement by the applied friction brake but the takeup reel continues to rotate in a direction to collect the web. The likelihood of breakage due to excessive tensional stressing cannot be eliminated by reducing the force with which the components of the friction brake grip the web upstream of the takeup reel because this could result in slippage of the web relative to the components of the brake. Such slippage would damage the photosensitive emulsion and/or would bring about pressure-induced exposure of the gripped web portion.

SUMMARY OF THE INVENTION

An object of the invention is to provide an apparatus for feeding and collecting webs of photographic paper or the like which is constructed and assembled in such a way that it positively prevents the development of excessive tensional stresses in a web when the latter is being collected by a takeup reel while a portion thereof upstream of the takeup reel is being gripped by the component parts of the brake.

Another object of the invention is to provide the apparatus with novel and improved means for insuring that the takeup reel accumulates tightly packed convolutions in spite of the fact that the application of braking means upstream of the takeup reel need not result in abrupt stoppage of the web.

A further object of the invention is to provide an apparatus of the above outlined character which positively prevents clockspringing of convoluted material on the takeup reel even if the brake is disengaged from the web.

An additional object of the invention is to provide an apparatus which can be installed in existing photographic printers or analogous machines wherein a web is transported stepwise past a treating station and is collected at intervals by a rotary takeup device.

Still another object of the invention is to provide an apparatus which reduces the likelihood of pressure-induced exposures of photosensitive emulsion of webs of photographic paper during and subsequent to transport of photographic paper through a printer or copier.

The invention is embodied in an apparatus for advancing and collecting an elongated web (e.g., photographic paper one side of which is coated with a layer of photosensitive emulsion) which is being withdrawn from a rotary reel or an analogous supply device and is being collected by an intermittently driven rotary takeup device (preferably a flangeless reel which can rotate only in a direction to convolute the web around its core). The apparatus comprises a pair of rolls or analogous advancing means for drawing the web off or from the supply device and for feeding the withdrawn portions or increments of the web toward the takeup device, drive means for rotating the takeup device in the aforementioned direction, first and second control means which are respectively actuatable to start and stop the drive means whereby the takeup device continues to rotate by inertia subsequent to stoppage of the drive means, and means for decelerating the web intermediate the advancing means and the takeup device. In accordance with a feature of the invention, the decelerating means comprises a first roller at one side of the web between the advancing means and the takeup device, a second roller at the other side of the web between the advancing means and the takeup device, means for biasing the second roller against the web opposite the first roller not later than on actuation of the second control means and with a force which suffices to effect rotation of the rollers when the drive means is stopped but the takeup device continues to rotate after the convoluted web is tightly packed thereon, and a brake (e.g., a hysteresis brake) having means (e.g., two disk-shaped permanent magnets) for yieldably opposing rotation of at least one of the rollers by the web to thereby decelerate the web and the takeup device to zero speed.

The control means preferably constitute two detectors which are adjacent to a loop former between the advancing means and the rollers. The first detector starts the drive means (e.g., an electric motor) when the size of the loop increases to a predetermined maximum value, and the second detector stops the drive means when the size of the loop is reduced to a predetermined minimum value.

The biasing means may comprise bearings which guide the second roller for movement substantially radially of the first roller and an electromagnet which is energizable on or shortly prior to actuation of second control means to abruptly propel the second roller toward the first roller. The energized electromagnet preferably urges the second roller against the web with a force which suffices to insure that the web cannot slip with respect to the peripheral surface of either roller. Thus, if the web portion between the rollers moves lengthwise because the takeup device continues to rotate due to inertia, the rollers are set in rotary motion against the opposition of the brake.

The novel features which are considered as characteristic of the invention are set forth in particular in the appended claims. The improved apparatus itself, however, both as to its construction and its mode of operation, together with additional features and advantages thereof will be best understood upon perusal of the following detailed description of certain specific embodiments with reference to the accompanying drawing.

DESCRIPTION OF THE PREFERRED EMBODIMENTS

Figure 1A:
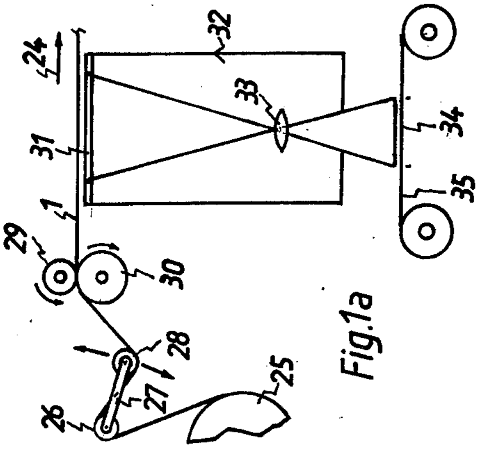
FIG. 1*a* is a diagrammatic elevational view of a photographic printer which embodies the improved apparatus, the means for feeding the web being shown at the left-hand side of the copying station.

FIG. 1*a* shows a portion of a photographic printer having a conveyor 35 or an analogous support for originals 34 to be copied. The original which ready to be copied is positioned at one end of a light duct 32 which contains an objective lens system 33 serving to image the original onto a portion of a web or strip 1 of photographic paper. That portion or frame of the web 1 which is exposed to light passing through the duct 32 is located at a printing or copying station 31.

The improved apparatus comprises a supply reel 25 which contains a supply of convoluted web 1, a fixedly mounted guide roll 26, a lever 27 which is pivotable about the axis of the roll 26 and carries at its free end a dancer roll or damping roll 28, and two advancing or feeding rolls 29, 30 which are shown as being located immediately upstream of the copying station 31. The web 1 is being withdrawn by the rolls 29, 30 in stepwise fashion and passes over the rolls 26, 28, through the nip of the rolls, 29, 30 and through the station 31. The rolls 29, 30 advance the web 1 by increments whose length equals or slightly exceeds the length of that portion which is exposed to light issuing from the duct 32 when the printer is actuated to make an exposure.

Figure 2:
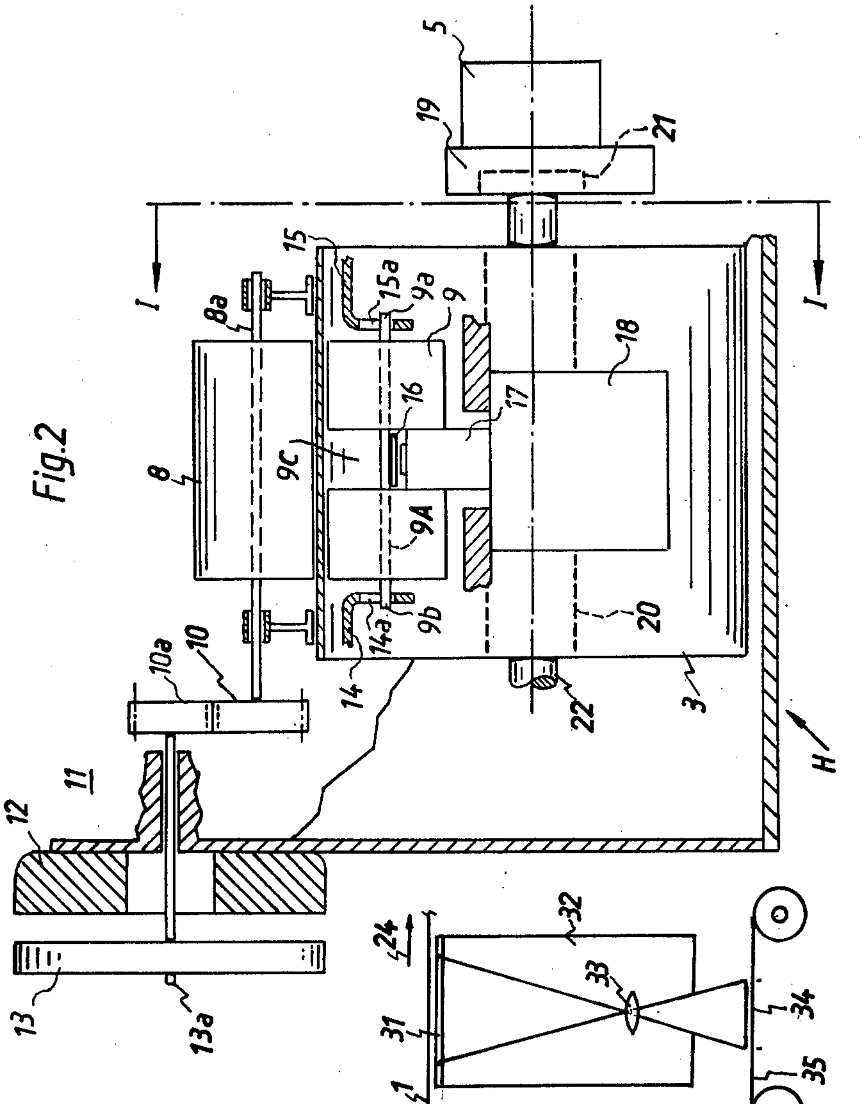
FIG. 2 is a sectional view as seen in the direction of arrows from the line II—II of FIG. 1*b*.
Figure 1B:
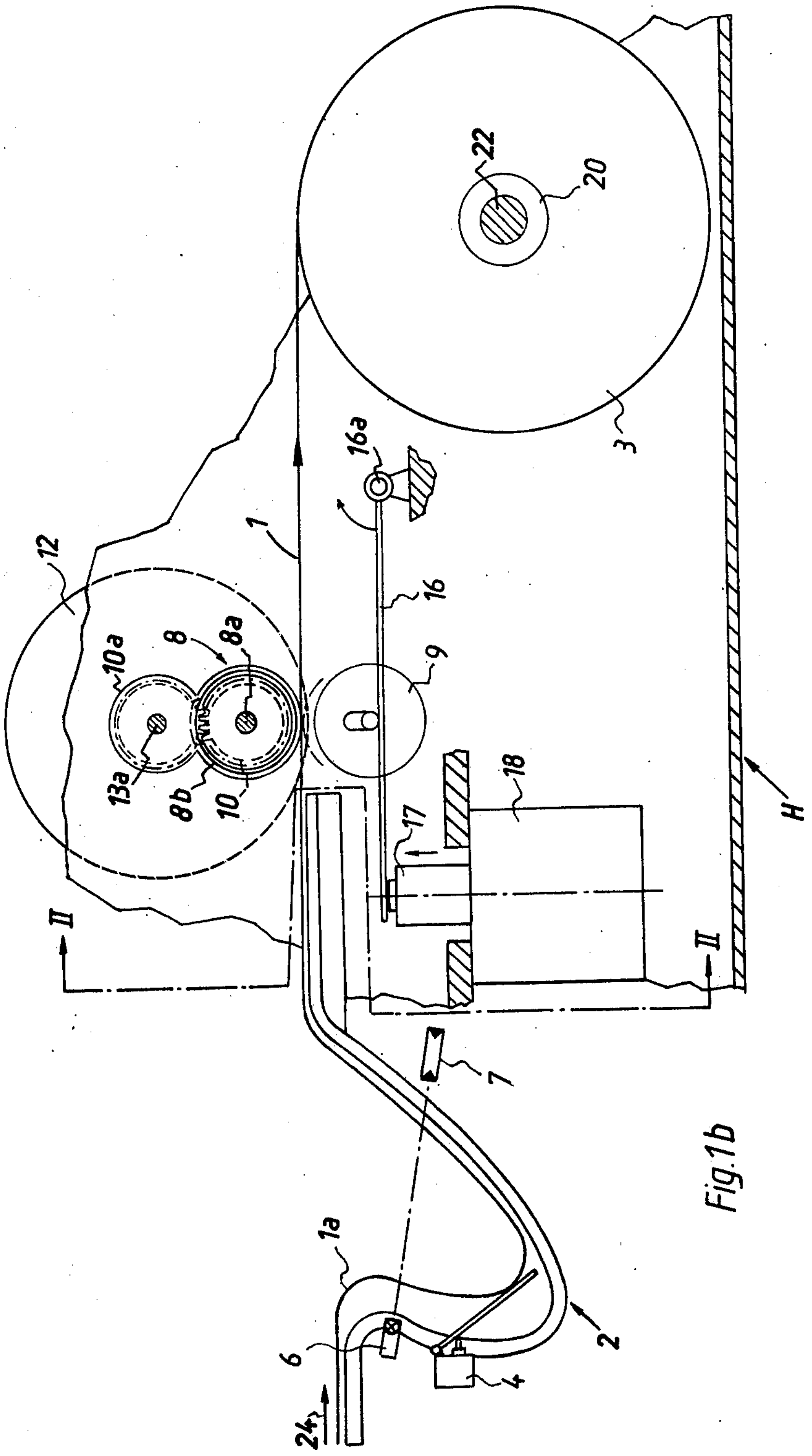
FIG. 1*b* is an enlarged partly sectional view of the web braking and collecting means in the apparatus of the printer shown in FIG. 1*a*, the section being taken in the direction of arrows as seen from the line I—I of FIG. 2.

FIG. 1*b* shows that the apparatus further comprises a web looping device or loop former 2 which is located downstream of the copying station 31 (as considered in the direction of stepwise movement of the web 1, see the arrow 24). The loop former 2 is preferably assembled of suitably bent rod-like components which together form a basket or receptacle large enough to form a loop 1*a* having a length which is a multiple (e.g., three or four times) the length of a print on the web. When the loop former 2 accumulates a loop 1*a* of requisite length, an electric motor or another suitable prime mover 5 (FIG. 2) is started to drive the core 20 of a takeup reel which collects the exposed frames of the web 1 whereby such frames form a series of convolutions 3. It will be noted that the rolls 29, 30 feed the web 1 in stepwise fashion, always by the length of a frame, and that the core 20 of the takeup reel collects the exposed frames in stepwise fashion, always by the combined length of several frames.

The means for starting the motor 5 comprises a mechanical detector 4 which is mounted in or adjacent to the loop former 2 and monitors the length of the loop 1*a*. When the length of the loop 1*a* reaches a preselected maximum value (e.g., the combined length of four frames or prints), the motor 5 is started to rotate the core 20 in a direction (clockwise, as viewed in FIG. 1*b*) to collect the exposed frames and to reduce the length of the loop 1*a* to a minimum permissible value which is monitored by a photoelectric detector having a light source 6 and a signal transmitting transducer 7. The detector 6, 7 then arrests the motor 5 whereby the core 20 continues to rotate due to its own inertia as well as due to inertia of convoluted exposed material 3 thereon. The light of the beam issuing from the source 6 has a wavelength which is outside of the range in which the photosensitive material of the web 1 is sensitive. It is clear that the detector 6, 7 can be replaced by a second mechanical detector or that the detector 4 can be replaced by a second photoelectric detector.

Those portions of the web 1 which advance beyond the loop former 2 pass between two rollers 8 and 9 the first of which is fixedly mounted in a frame or housing H. The lower roller 9 is movable up and down to respectively urge the web 1 against the roller 8 or to allow the web to advance toward the core 20 of the takeup reel without any friction or with a minimum of friction. The roller 8 is rotatable with its shaft 8*a* and is coupled to a hysteresis brake 11 by means of a gear transmission including a gear 10 on the shaft 8*a* and a gear 10*a* which meshes with the gear 10 and is mounted on the shaft 13*a* of a disk 13 forming part of the brake 11. The shaft 13*a* is journalled in the frame H and the disk 13 is movable axially of the shaft 13*a* nearer to or further away from a second disk 12 which is fixedly mounted in and cannot rotate with respect to the frame H. The brake 11 is a commercially available module and its mode of operation is as follows: The disks 12 and 13 are permanent magnets and are premagnetized in such a way that the magnetic force lines of the field of the disk 12 are normal to and intersect the force lines of the field of the disk 13. Thus, the disk 12 offers a predetermined resistance to rotation of the disk 13 with the shaft 13*a*, gears 10*a*, 10, shaft 8*a* and roller 8. By changing the distance between the disks 12, 13 (i.e., by moving the disk 13 nearer to or further away from the disk 12), one can select the magnitude of resistance which the brake 11 offers to rotation of the roller 8. The disk 13 can be moved axially of the shaft 13*a* with respect to a suitable scale or dial (not shown) which is calibrated to indicate the magnitude of braking action in different axial positions of disk 13.

The lower roller 9 is mounted on a shaft 9A having trunnions 9*a*, 9*b* which are respectively movable up and down in the slots 14*a*, 15*a* of two bearing members or brackets 14, 15 mounted in the frame H. The median portion of the roller 9 has a circumferential groove 9*c* which may but need not extend radially inwardly all the way to the shaft 9A and receives an intermediate portion of a lever 16 which is fulcrumed in the frame H, as at 16*a*, and is articulately coupled to or rests on the vertically movable armature 17 of an electromagnet 18. The lever 16 can be said to constitute a portion of the armature 17. When the electromagnet 18 is energized, the armature 17 moves abruptly upwardly, as seen in FIG. 1*b*, and causes the lever 16 to move the roller 9 toward the roller 8 whereby the web 1 is urged against the roller 8 with a force which is sufficient to prevent any slippage with respect to the peripheral surfaces of the rollers. At least one of the rollers (e.g., the roller 8) has an outermost portion or rim (see 8*b*) consisting of a material, such as rubber, with a high coefficient of friction. The frictional engagement between rollers 8, 9 and web 1 in response to energization of the electromagnet 18 is more pronounced than the braking force of the brake 11.

The motor 5 can drive the core 20 of the takeup reel through the medium of a step-down transmission 19 having a one-way clutch 21 and an output shaft 22 which is rigid with the core 20. The clutch 21 prevents any rotation of the shaft 22 and core 20 in a direction to pay out the convolutions 3 of exposed web.

The takeup reel does not have any flanges and its core 20 is preferably dimensioned in such a way that it can collect relatively wide or relatively narrow webs.

The operation:

The printer of FIG. 1*a* is operated to expose successive frames of the web 1 which is moved intermittently by the advancing rolls 29, 30 always by the length of a frame. The printer can make single exposures of successive originals or several exposures of a single original 34. The exposed frames accumulate in the loop former 2 and form the loop 1*a*. When the loop 1*a* is sufficiently long to move the pivotable flap of the mechanical detector 4 to a position which is indicative that the loop former 2 has accumulated a predetermined number of exposed frames, the detector 4 completes the circuit of the motor 5 which begins to rotate the core 20 of the takeup reel through the medium of the step-down transmission 19. The rotating core 20 reduces the length of the loop 1*a* and the loop ultimately allows a light beam to pass from the source 6 to the transducer 7 so that the latter transmits a signal which arrests the motor 5. The electromagnet 18 remains deenergized while the length of the loop is being reduced to that size which causes the photoelectric detector 6, 7 to arrest the motor 5. Therefore, as the core 20 collects the web 1, the width of the gap between the rollers 8 and 9 exceeds the thickness of the web 1. Consequently, the web 1 is not braked at all, at least not during that stage of rotation of the core 20 when the size of the loop 1*a* exceeds the preseselected minimum value. Such mode of collecting the web 1 results in the formation of relatively loose convolutions 3 on the core 20.

The electromagnet 18 is energized simultaneously with or shortly prior to stoppage of the motor 5. This results in abrupt movement of the roller 9 toward the roller 8, and the force with which the armature 17 of the energized electromagnet 18 causes the lever 16 to urge the roller 9 against the underside of the web 1 (whereby the upper side of the web is urged against the roller 8) is such that there is no slippage between the web and the peripheral surfaces of the rollers. The inertia of the core 20 and of convolutions 3 thereon (subsequent to stoppage of the motor 5) suffices to insure that the core continues to rotate in a clockwise direction, as viewed in FIG. 1*b*, so that the convolutions 3 are tightly packed because the web 1 is gripped by the rollers 8 and 9. If the web 1 causes the roller 8 to rotate counterclockwise, as viewed in FIG. 1*b*, such rotation is opposed by the brake 11 because all angular movements of the roller 8 are shared by shaft 8*a*, gears 10, 10*a*, shaft 13*a* and disk 13. The roller 9 is preferably an idler roller. During the initial stage of rotation of the roller 8, the braking force rises above that which is furnished by the brake 11, and the braking force then decreases to that furnished by 11 so that the web 1 is subjected to a constant decelerating action. Tensional stresses to which the web 1 is subjected during such braking are not sufficient to result in breakage of the web, even if the diameter of the outermost convolution 3 is very large, i.e., even if the major part of the web 1 is already convoluted on the core 20.

Since the frictional engagement between the rollers 8 and 9 on the one hand and the respective sides of the web 1 on the other hand is sufficient to prevent any slippage of the web, the rollers cannot damage or score the photosensitive emulsion at one side of the web. The braking of web 1 while the core 20 continues to rotate due to inertia results in the formation of tightly packed convolutions 3. When the motor 5 is arrested by the detector 6, 7, the core 20 can come to a halt after it completes one or more full revolutions or after it completes a portion of a single revolution, depending on the diameter of the outermost convolution 3. Since the one-way clutch 21 prevents any counterclockwise rotation of the core 20 (as viewed in FIG. 1*b*), the clockspringing of convolutions 3 is prevented and the convolutions remain tightly packed when the core 20 is brought to a full stop. The clutch 21 also prevents clockspringing when the core 20 is thereupon at a standstill while the advancing rolls 29, 30 feed increments of exposed web material into the loop former 2. The prevention of clockspringing is beneficial because the takeup reel is capable of accurately winding the web onto the core 20 in spite of the fact that the takeup reel does not have any flanges. The provision of flanges on the takeup reel is considered necessary in many presently known photographic printers. As a rule, a web of photographic paper comprises several layers including a layer of photographic emulsion, a layer of fibrous material and one or more layers of synthetic plastic material. Therefore, the web normally tends to curl along one or both marginal portions so that a section taken transversely across the web has a concave and a convex side. Such tendency to curl has been opposed by flanges on conventional takeup reels. On the other hand, and as mentioned above, the flanges are undesirable for several important reasons, primarily because they must be adjusted (or the takeup reel replaced with a different takeup reel) whenever the operators wish to employ a web having a width which is less than or exceeds the width of the preceding web or webs.

The apparatus of the present invention can be said to produce an indirect braking action. Thus, the rollers 8, 9 can rotate against the opposition of the brake 11 if the tension in the web 1 reaches or approximates a value at which the web would be likely to break. At the same time, the electromagnet 18 invariably prevents any slippage of the web 1 relative to the roller 8 and/or 9 so that the emulsion of the web is not affected by the braking action, irrespective of whether the web portion between the rollers 8, 9 is arrested as soon as the electromagnet 18 is energized or the combined inertia of core 20 and convolutions 3 suffices to rotate the rollers 8, 9 for a while subsequent to stoppage of the motor 5. The critical stage in transport and winding of the web is the instant when the rollers 8, 9 engage the web while the takeup reel continues to rotate, and the apparatus of the present invention insures that the engagement between the rollers and the web does not result in breakage, irrespective of the diameter of the outermost convolutions 3, because the rollers can be set in rotary motion at a peripheral speed which is identical with the speed of the web portion therebetween.

The hysteresis brake 11 constitutes a presently preferred component of the improved web feeding and collecting apparatus. However, it is equally possible to employ another type of brake, e.g., a friction brake which can furnish a predetermined braking force and is preferably adjustable to enable the operator to select the magnitude of the braking force. All that counts is to couple the brake with one of the rollers 8, 9 in such a way that the rollers need not slip relative to the web 1 or vice versa when the web 1 is clamped between 8 and 9 and the core 20 continues to rotate, either because the motor 5 is still on or due to inertia.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. Apparatus for advancing and collecting an elongated web which is being withdrawn from a supply device and is being collected stepwise by an intermittently driven rotary takeup device, comprising advancing means for drawing the web off said supply device and for feeding the withdrawn portions of the web toward said takeup device; drive means for rotating said takeup device, in a direction to collect the web; first and second control means actuatable to respectively start and stop said drive means whereby said takeup device continues to rotate in said direction by inertia subsequent to stoppage of said drive means until and after the convoluted web is tightly packed therearound; and means for decelerating the web intermediate said advancing means and said takeup device, including a first roller at one side of the web between said advancing means and said takeup device, a second roller at the other side of the web between said advancing means and said takeup device, means for biasing said second roller against the web opposite said first roller responsive to actuation of said second control means and with a force which suffices to effect rotation of said rollers when said drive means is stopped but said takeup device continues to rotate in said direction after the convoluted web is tightly packed therearound, and a brake having means for yieldably opposing rotation of at least one of said rollers by said web to thereby progressively decelerate the rotation of said takeup device to zero speed.

2. Apparatus as defined in claim 1, wherein said advancing means comprises rolls arranged to feed the web stepwise and said web has a layer of photosensitive material.

3. Apparatus as defined in claim 1, wherein said second roller is reciprocable substantially radially of said first roller and said biasing means comprises electromagnet means which is energizable to propel said second roller toward said first roller.

4. Apparatus as defined in claim 1, wherein said means for yieldably opposing rotation of at least one of said rollers is arranged to apply to said one roller a constant braking force of predetermined magnitude.

5. Apparatus as defined in claim 4, wherein said brake is a hysteresis brake.

6. Apparatus as defined in claim 1, further comprising means for preventing rotation of said takeup device counter to said direction.

7. Apparatus as defined in claim 6, wherein said rotation preventing means comprises a one-way clutch in said drive means.

8. Apparatus as defined in claim 1, wherein said second roller has two coaxial trunnions and further comprising bearing means for said second roller, said bearing means having slots extending substantially radially of said first roller and reciprocably receiving said trunnions, said biasing means comprising a lever having a first end portion pivotable about a fixed axis, an intermediate portion adjacent to said second roller, and a second end portion, said biasing means further comprising an electromagnet having an armature adjacent to the second end portion of said lever, said electromagnet energizable to thereby pivot said lever against said second roller.

9. Apparatus as defined in claim 8, wherein said second roller has a circumferential groove for said intermediate portion of said lever.

10. Apparatus as defined in claim 1, wherein the force applied by said biasing means to said second roller suffices to prevent any slippage of the web relative to said rollers while said biasing means urges said second roller against the web and said second roller thereby biases the web against said first roller.

11. Apparatus as defined in claim 1, wherein said one roller is said first roller.

12. Apparatus as defined in claim 1, further comprising means for looping the web intermediate said advancing means and said rollers when said advancing means feeds the web and said drive means is stopped, said first and second control means respectively comprising first and second detector means arranged to monitor the size of the looped web and to respectively start and arrest said drive means when said size respectively reaches a predetermined maximum value and a predetermined minimum value.

13. Apparatus as defined in claim 12, wherein said advancing means comprises rolls arranged to feed the web by increments of predetermined length, the difference between said maximum and minimum values exceeding said predetermined length.

14. Apparatus as defined in claim 12, wherein at least one of said detector means is a mechanical detector.

15. Apparatus as defined in claim 12, wherein at least one of said detector means is a photoelectric detector.

* * * * *